(12) United States Patent
Hahn et al.

(10) Patent No.: US 9,903,615 B2
(45) Date of Patent: Feb. 27, 2018

(54) SOLAR HEAT COLLECTING DEVICE

(75) Inventors: Hans Helmut Hahn, Pretoria (ZA);
Jan Jorna, Port Elizabeth (ZA)

(73) Assignee: AQUA FILTER (PTY) LTD, Pretoria (ZA)

( * ) Notice: Subject to any disclaimer, the term of this patent is extended or adjusted under 35 U.S.C. 154(b) by 1378 days.

(21) Appl. No.: 13/560,166

(22) Filed: Jul. 27, 2012

(65) Prior Publication Data

US 2013/0008433 A1 Jan. 10, 2013

Related U.S. Application Data

(63) Continuation-in-part of application No. PCT/ZA2011/000006, filed on Jan. 27, 2011.

(30) Foreign Application Priority Data

Jan. 29, 2010 (ZA) .................................. 2010/0701

(51) Int. Cl.
| | |
|---|---|
| *F24J 2/46* | (2006.01) |
| *F24J 2/26* | (2006.01) |
| *F24J 2/48* | (2006.01) |
| *F28F 19/00* | (2006.01) |

(52) U.S. Cl.
CPC .............. *F24J 2/4647* (2013.01); *F24J 2/265* (2013.01); *F24J 2/464* (2013.01); *F24J 2/4612* (2013.01); *F24J 2/4636* (2013.01); *F24J 2/485* (2013.01); *F28F 19/004* (2013.01); *F28F 2255/16* (2013.01); *Y02B 10/20* (2013.01); *Y02E 10/44* (2013.01)

(58) Field of Classification Search
CPC ........ F24J 2/4612; F24J 2/4636; F24J 2/4647; F16L 41/088; F16L 5/025; F16L 5/10

USPC ....... 126/655, 657, 658, 660, 663, 664, 666, 126/670; 165/172–176
See application file for complete search history.

(56) References Cited

U.S. PATENT DOCUMENTS

| | | | | |
|---|---|---|---|---|
| 2,033,435 | A | * | 3/1936 | Loven ........................... 126/314 |
| 2,628,799 | A | * | 2/1953 | Aaby ............................... 248/57 |
| 3,125,358 | A | * | 3/1964 | Kleinberg et al. ............... 285/55 |
| 3,936,589 | A | * | 2/1976 | Teeters et al. ................. 174/669 |

(Continued)

FOREIGN PATENT DOCUMENTS

| | | |
|---|---|---|
| DE | 2803821 A1 | 8/1979 |
| DE | 9418188 U1 | 2/1995 |

(Continued)

*Primary Examiner* — Jorge Pereiro
(74) *Attorney, Agent, or Firm* — Michael Pettit

(57) ABSTRACT

A solar heat collecting device of the flat panel type, a process for its manufacture and parts thereof, made of extruded profiles in particular of aluminum or aluminum alloys. The device comprises a casing accommodating a heat collector assembly comprising a plurality of elongate extruded heat collector bodies, side by side, each having a tube co-axial with its axis of extrusion, flanked on each of its opposite sides integrally by an extruded web and further comprising a manifold at each end to which the respective tube ends are sealingly and communicatingly brazed. The edges of the adjoining webs of adjoining elongate bodies overlap slightly but are movable free of mechanical constraint or mutual attachment in relation to one another. Together the elongate bodies present the incoming solar radiation with a substantially plane uninterrupted area for absorption.

27 Claims, 6 Drawing Sheets

(56) References Cited

U.S. PATENT DOCUMENTS

| | | | |
|---|---|---|---|
| 4,067,317 A * | 1/1978 | Hubbard | 126/664 |
| 4,083,093 A * | 4/1978 | Chertok | 29/890.033 |
| 4,098,259 A * | 7/1978 | Barber et al. | 126/661 |
| 4,111,188 A | 9/1978 | Murphy | |
| 4,114,598 A * | 9/1978 | Van Leeuwen | 126/660 |
| 4,136,272 A * | 1/1979 | Rudd | 219/107 |
| 4,154,223 A * | 5/1979 | Lof | 126/713 |
| 4,252,103 A * | 2/1981 | Carter et al. | 126/706 |
| 4,336,643 A * | 6/1982 | Roberts | 29/890.038 |
| 4,336,793 A * | 6/1982 | Ahearn et al. | 126/621 |
| 4,341,200 A * | 7/1982 | Bowen | 126/704 |
| 4,679,617 A * | 7/1987 | Keldmann | 165/56 |
| 6,082,353 A * | 7/2000 | van Doorn | 126/659 |
| 6,349,946 B1 * | 2/2002 | Daugherty | 277/606 |
| 6,736,134 B2 * | 5/2004 | Marko | 126/680 |
| 8,186,341 B2 * | 5/2012 | Lata Perez | 126/663 |
| 8,286,627 B2 * | 10/2012 | Moller | 126/704 |
| 8,540,287 B2 * | 9/2013 | Williams | 285/197 |
| 2009/0126717 A1 | 5/2009 | Nass | |
| 2010/0132764 A1 * | 6/2010 | Plaschkes | 136/246 |
| 2010/0170669 A1 * | 7/2010 | Jaworowski | 165/173 |
| 2011/0146669 A1 * | 6/2011 | Bartol et al. | 126/704 |

FOREIGN PATENT DOCUMENTS

| | | | |
|---|---|---|---|
| EP | 2096376 A2 * | 9/2009 | |
| FR | 2 864 210 A1 | 6/2005 | |
| GB | 2385910 A | 9/2003 | |
| WO | WO 2005015094 A1 * | 2/2005 | |
| WO | WO 2010/011151 A2 | 1/2010 | |

* cited by examiner

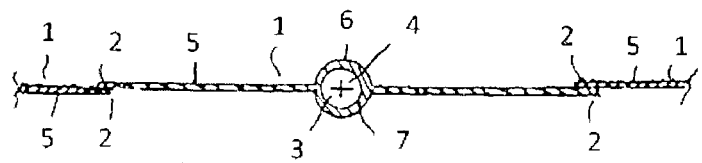
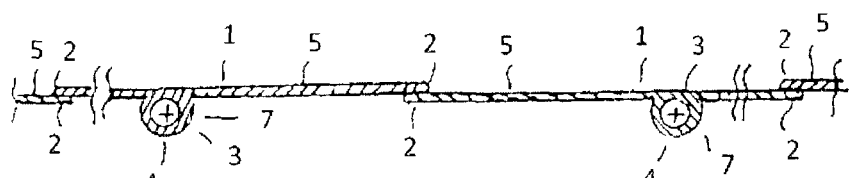
Fig. 1
Fig. 2
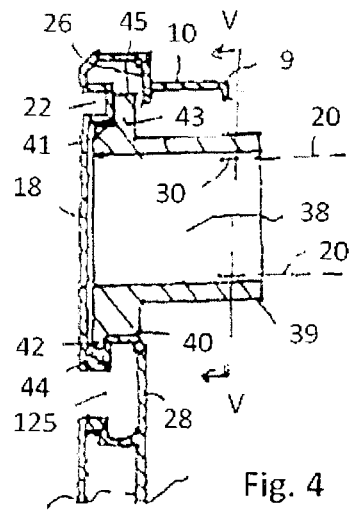
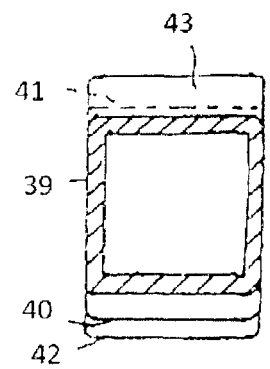
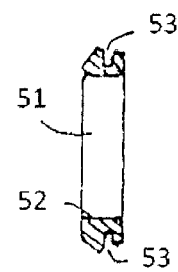
Fig. 4
Fig. 5
Fig. 7
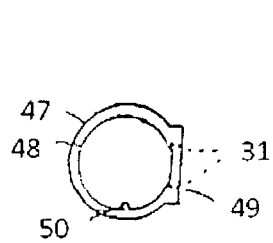
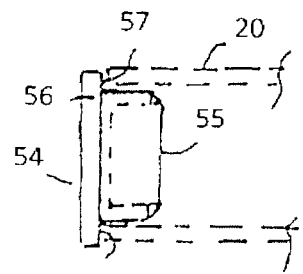
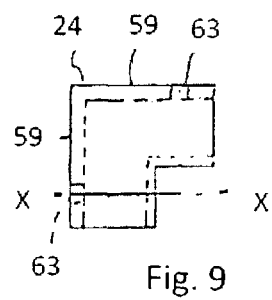
Fig. 6
Fig. 8
Fig. 9

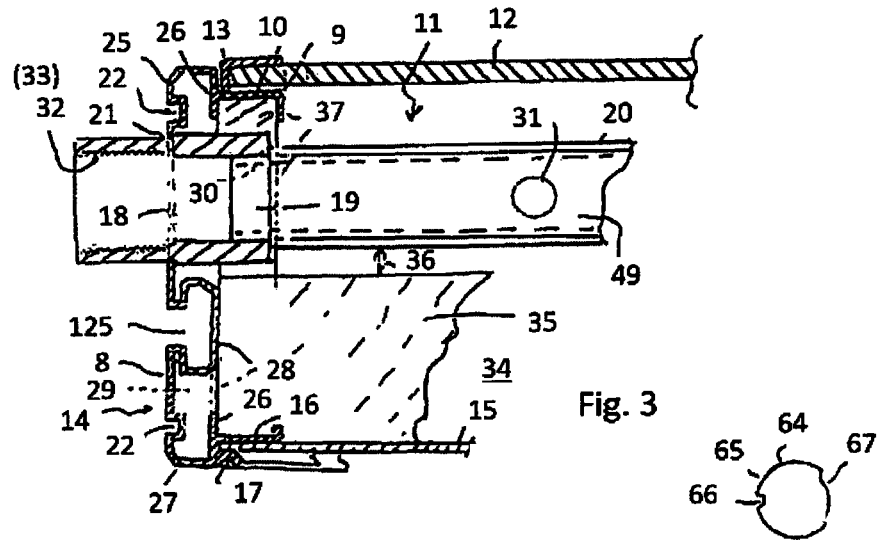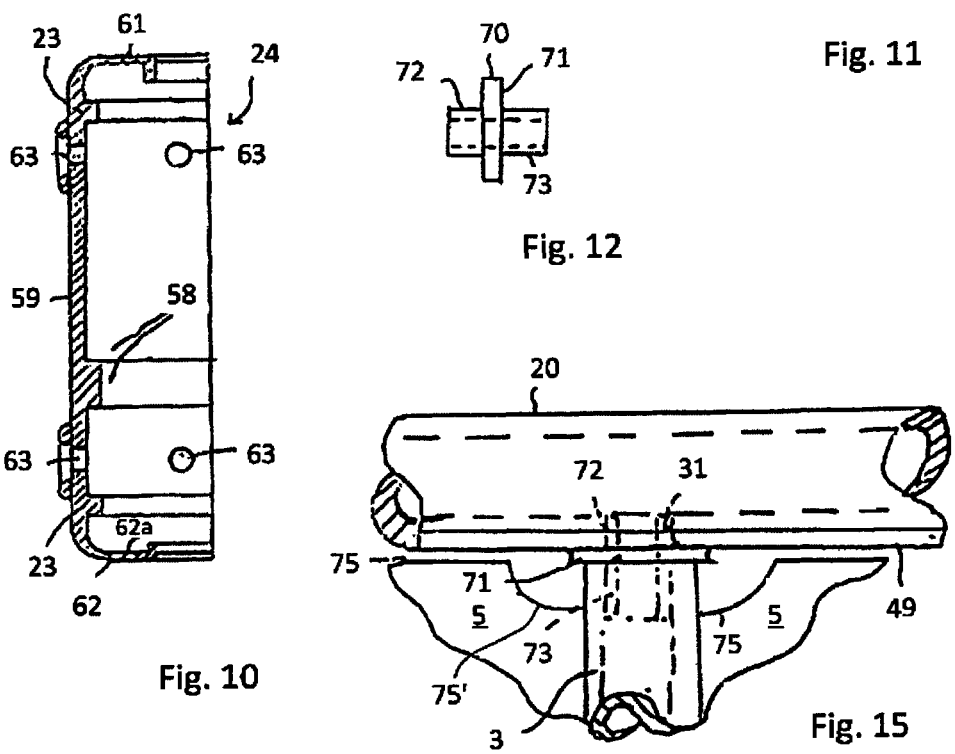

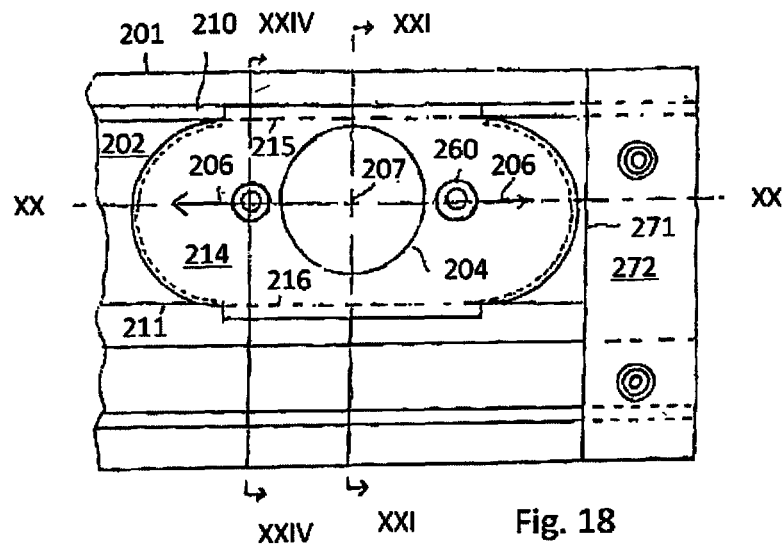
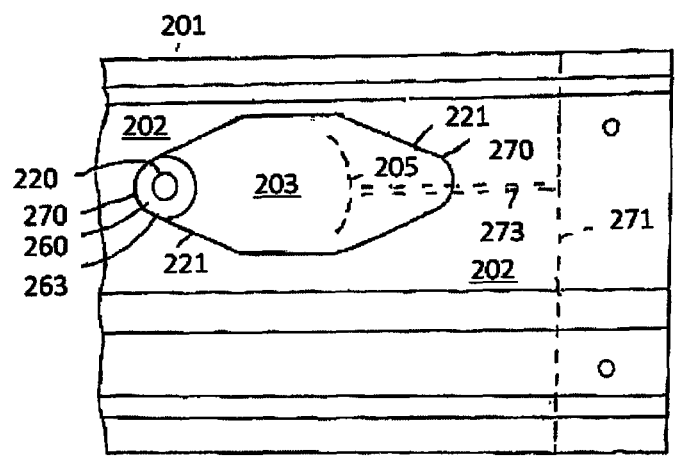
Fig. 18
Fig. 19

SOLAR HEAT COLLECTING DEVICE

CROSS-REFERENCE TO RELATED APPLICATIONS

This application is a continuation in part of co-pending International Application No. PCT/ZA2011/000006, filed Jan. 27, 2011 (Publication No. WO/2011/094770, dated Aug. 4, 2011), entitled "Solar Heat Collecting Device", and claiming priority from South Africa Patent Application No. ZA2010/0701, filed on Jan. 29, 2010; the entire disclosures of each of the applications identified above are incorporated herein by reference to provide continuity of disclosure.

BACKGROUND OF THE INVENTION

The present invention relates to a solar heat collecting device suitable for manufacture from extruded profiles, more particularly of aluminium or aluminium alloy, a process for its manufacture and novel parts thereof.

SUMMARY OF THE INVENTION

More particularly, the present invention relates to such a solar heat collecting device of the flat panel type, including a panel casing defined by an upper side which provides a window area for facing and admitting incoming solar radiation; surrounding walls forming a frame between the upper side and a closed under side opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly.

GB 1551366 discloses such a solar heat collecting device, wherein the two webs of each elongate heat collecting body lie at less than 180° and preferably at an angle of between 75 and 120°, e.g. 90° to one another. This is said to improve solar heat absorption. A plurality of the heat collecting bodies is fitted side-by-side, the ends of the webs (fins) being held together by mutually interlocking complementary formations.

GB 2385910 discloses a similar arrangement. In this case the mutually interlocking elongate body profiles carry, in addition, extruded longitudinal C-shaped cavities for accommodating screws by which the tubular sections are fitted in sealing relationship to manifolds made of plastics.

A different approach forms the subject of WO 2006/135942 A3, wherein each solar heat collector body of extruded aluminium comprises a flat tubular body through which flows the heat carrier fluid, the hollow tubular cavity/ies of which extend over the entire width of the heat collector body resulting in a volume of heat carrier fluid of about 15 L per panel of nominally 2 m². This large volume adds considerably to the weight of the panel and reduces the thermal and cost efficiency, particularly when employed in the indirect heating mode. An emphasised feature of this prior art are substantial gaps between the heat collector bodies.

These are only three examples of a vast number of proposals for solar heating panels, made of extruded profiles, in particular of aluminium or aluminium alloy, instead of from very expensive copper sheeting and tubing.

German Gebrauchsmuster 9418188 and DE 2803821A1 both disclose solar heat flat panel collectors including solar heat collector assemblies composed of two manifolds between which a plurality of extruded collector bodies are fitted side by side, each comprising a tube extending continuously in the extrusion direction of the profile and integrally extruded with the tube on each of the opposite sides of the tube (also known in the art as "riser tube") a web (also known as a "fin") facing the window area of the panel. The adjoining webs of adjoining collector bodies are not connected and their respective edges face each other with a gap in-between, whereas the terminal edges of the webs abut the manifolds.

The present invention is based on several years of design effort and experimentation aimed at improving the cost-effectiveness and thermal efficiency of solar heating panels without sacrificing durability and other important characteristics. In doing so, it was necessary to discard numerous prejudices created by the prior art as well as overcome drawbacks (frequently previously unrecognised) of prior art proposals. In order for such panels to be truly competitive, it was found that a large number of objectives need to be considered and optimised in combination:—

A single basic design which attains, without major modifications, a high thermal efficiency in all commonly used solar heating (in particular water-heating) systems, both direct and indirect heating, open-loop and closed-loop systems, low pressure and high pressure applications, circulation by thermo-siphoning or pumping.

The weight of the panel should be minimised for saving on material as well as transportation and structural/installation costs.

A fine balance need be achieved between minimising wall thicknesses, mechanical strength and technical considerations of high-speed extrusion from aluminium or aluminium alloys and life expectancies of dies.

The panel must be suitable for high throughput mass production from a minimum of easily mass-produced components, preferably in modular fashion and readily adaptable to widely variable size and dimensional requirements to meet technical and architectural needs, whether for domestic, public building, industrial or agricultural uses.

Particularly important is an ample allowance for thermal expansion and contraction due to the large temperature fluctuations, to which such panels are subjected in practice.

The volume of heat carrier fluid in the panel should be minimised, not only to reduce the weight of the panel, but also for improved thermal efficiency, particularly in the case of indirect heating, in which latter case, besides potential heat transfer inefficiencies, the cost of the heat carrier fluid is a further significant factor. Liquid passages should, moreover, be designed to minimise blockages due to scaling or solids entrained in the liquid passing through.

Last, but not least, the panel should be able to meet the modern certification standards set by national and international standard authorities, including mechanical tests, rainproofing tests, dry-standing tests (wherein the panel is emptied and the empty panel is repeatedly and for long durations exposed to the sun and must withstand the resultant extreme temperatures and extreme thermal expansions and contractions).

The aforementioned prior art panels all had shortcomings in one or more of the above-listed requirements.

Accordingly, the invention now provides a solar heat collecting device as set out in the opening paragraph, wherein the elongate heat collector bodies are each formed as an integrally extruded aluminium or aluminium alloy profile, comprising said tubular cavity in the form of a tube extending continuously in the extrusion direction of the profile and, integrally extruded with the tube on each of the opposite sides of the tube, a web having a side facing the window aperture area, preferably parallel thereto, the webs on opposite sides extending from the tube at an angle to one another of between 170° and 190°, preferably between 175° and 185°, preferably 180° and preferably being coplanar with one another; the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly.

The integrally extruded design serves to avoid any discontinuity which would obstruct an uninhibited heat flow from the web areas to the tube and the interface between the inner tube periphery, from where the heat transfer to the heat carrier fluid takes place. This is important for thermal efficiency.

In contrast to proposals such as WO2006/135942A3, the now uninterrupted area for absorption ensures that none of the incoming solar radiation bypasses the area for absorption through gaps between the heat collector bodies, thus shining directly into the air space behind the heat collector bodies, from where that heat is mostly absorbed by the less efficient route of first heating that air space and only then surrendering some of that heat by heat exchange from that air space through the rear of the heat collector bodies to the heat carrier fluid. Furthermore, compared with the abovementioned or similar prior art, the minimal cross-sectional area of the single cavity, compared with the overall width of the individual collector body, drastically reduces the volume of heat carrier fluid contained in the collector body and increases the flow velocity of such fluid. The latter feature enhances the heat transfer from the walls of the tubular cavity to the fluid, and both features contribute to the desired much higher temperature of the fluid leaving the solar heat collecting device.

According to preferred embodiments in order for the webs of adjoining heat collector bodies to be movable transversely to the tube in relation to one another (and thereby avoiding stresses due to thermal expansion and contraction), these webs of adjoining collector bodies are disconnected from one another but overlap, preferably by not more than 5 mm, more preferably by from 1 to 3.5 mm, e.g. 3-3.5 mm.

According to a further aspect of the invention, the features of which are preferably combined with the aforesaid features of a solar heat collecting device, there is provided a solar heat collecting device, again as set out in the opening paragraph, wherein the surrounding walls of the panel casing are composed of extruded profiles, each such profile, when viewed in cross-section, taken normal to the extrusion axis, being generally C-shaped, formed by top and bottom limbs connected integrally by the upright side wall portion of the profile, wherein the upper limb forms a rebated ledge for supporting a solar radiation transmitting and heat trapping cover sheet (normally of "iron-free glass"), the outer boundary of the ledge is formed by an upwardly directed limb of a generally channel shaped portion, the arcuate return limb of which links up with and becomes the top of the side wall portion of the profile, the bottom limb of the C-shaped profile approximates a mirror image of the top limb, forming a reversed ledge, against which a backing panel is to be fitted and held in place, optionally together with reinforcement bracings, parallel to the ledge, the side wall portion of the profile is generally straight except for a small rebate near the top and a similar rebate near the bottom accommodating matching bead formations of the corner pieces holding the four sides of the casing frame together, the ends of the profiles being chamfered at 45°, fitted together to form the sides of the panel casing and so held together by the aforesaid corner pieces having the said beads matching and accommodated in the aforesaid rebates of the profiles, the corner pieces being fitted to the outside of each corner.

According to yet another aspect of the invention, there is provided a profile for use as a solar heat collector body in solar thermal collectors of the flat panel type, in particular as set out in the aforegoing, integrally extruded from aluminium or aluminium alloy, which comprises in one integrally extruded piece a central tube of circular cross-section, the tube axis of which extends in the direction of extrusion, flanked by a pair of webs which extend substantially at an angle of between 170° and 190°, preferably of 180°, to one another to both sides of the tubular region.

Preferably, the webs are in a plane which includes the tube axis.

The tubular region of the heat collection body preferably has a substantially circular cross-section, thereby optimising pressure resistance and minimising the ratio of wall circumference to cross-sectional area and minimising the weight. The integral extrusion of the webs and tubular region optimises heat transfer from the webs to the tube interior, besides avoiding any manufacturing step of bonding, e.g. welding the webs to the tabular region.

At least the side of the profile which is to face solar radiation in the collector panel is preferably treated for improved absorption of the solar spectrum, e.g. blackened by anodising or black chromating.

The scope of the invention includes a solar heat collector body made of the aforesaid profile and a solar heat collector assembly including one or more of the heat collector bodies, bonded, preferably welded or soldered, e.g. brazed at opposite ends via the tubular region in communicative relationship to tubular manifolds.

The invention also relates to a method and means for the suspension of a solar heat collector assembly, wherein manifold ends of the solar heat collector assembly are supported by walls of a flat panel collector casing in slider brackets, which allow for thermal expansion and contraction of the heat collector assembly and the use of such a suspension in a solar heat flat panel collector and a solar heat flat panel collector including such suspension, more particularly as aforesaid which includes such a suspension and, more particularly, including providing reliable slidability, bearing in mind the weight of the solar heat collector assembly, particularly when filled with heat transfer liquid, and the dimensional changes caused by thermal expansion and contraction, combined with ease of assembly in mass manufacture and providing a neat outside finish to the completed panel. In this context a preferred embodiment provides additional protection against water ingress into the panel even under severe weather conditions, even if the sides of the panel are exposed to weather. The suspension must furthermore be capable of being manufactured from materials able to withstand the high temperatures which can occur under extreme operating conditions and minimise heat losses through the slidable suspension region. Such embodiments include the following features:

a wall region of the casing having an aperture dimensioned for the passage there through and through the wall region of an end member of a manifold of the solar heat collector assembly and for allowing linear displacement of the end member transversely to the wall region in a sliding direction, normal to the axis of the end member;

an outer slider bracket member in sliding relationship to the outside of the wall region and covering the outside of the aperture through the wall region within the limits of joint linear displacement of the outer slider bracket member and the end member of the manifold, said end member being held in the outer slider bracket member;

an inner slider bracket member in sliding relationship to the inside of the wall region and in fixed relationship to the outer slider bracket member, the end member of the manifold passing through and being supported in an aperture of the inner slider bracket member;

guide profilings on the wall region parallel to the sliding direction;

guide formations on either or both of the outer slider bracket member and the inner slider bracket member, said guide formations matching and being in sliding engagement with guide profilings as aforesaid on the outside of the wall region.

More particularly, the inner slider bracket member has guide formations matching and being in sliding engagement with guide profilings as aforesaid.

Alternatively or preferably in addition the outer slider bracket member has guide formations matching and being in sliding engagement with guide profilings on the inside of the wall region.

The wall region is preferably part of a side wall of the casing of a solar heat flat panel collector.

More particularly, the wall region is a region of a side wall of a panel casing for containing the solar heat collector assembly, and the axis of the end member is coaxial with or parallel to a longitudinal axis of the manifold. Alternatively, the wall region is a region of a bottom wall of a panel casing for containing the solar heat collector assembly and the axis of the end member is normal to a longitudinal axis of the manifold. The sliding direction is designed to compensate for thermal expansion and contraction parallel to the plane of the bottom wall.

The terms "inside" and "outside" relate respectively to the inside and the outside of the casing containing the solar heat collector assembly.

More particularly, the outer slider bracket member, through which passes in sealing relationship the end member for the manifold, in all its sliding positions, performs the function of an external closing plate covering the aperture for the passage therethrough of the end member of the manifold, and has guide profilings matching and in sliding engagement with guide profilings on the outside of the wall region; The inner slider bracket member has guide formations matching and in sliding engagement with guide profilings on the inside of the wall region; the outer and inner slider bracket members on opposite sides of the wall region are rigidly interconnected by fasteners passing through the aperture on opposite sides, in the sliding direction of the tubular end member and for accommodating the fasteners and, at the same time, limiting the extent of the sliding movement of the slider bracket, the aperture through the wall region is extended by sliding limiting extensions.

A use according to the invention of the suspension of a solar heat collector assembly, set out above, is that it forms part of a solar heat flat panel collector, e.g. a solar water heater flat panel, either of the direct or indirect heating type and either using thermo-siphoning or pumped circulation of the heat transfer liquid.

Additional and alternative or preferred integers or features of the invention will become apparent from what follows:

BRIEF DESCRIPTION OF THE DRAWINGS

The invention will now be elucidated by way of example with reference to the accompanying drawings, showing in FIGS. 1 and 2 cross-sectional views of two embodiments of elongate heat collector bodies and their side-by-side interrelationship as part of a heat collector assembly of a solar heat collecting device according to the invention;

FIG. 3 a cross-sectional broken-away partial view of one side of a solar heat collecting device according to the invention;

FIG. 4 a cross-section of the side profile of the casing of the solar heat collecting device in FIG. 1 with a manifold slider bracket in longitudinal section;

FIG. 5 a cross-section along V-V in FIG. 4;

FIG. 6 an end-on view of the extruded manifold profile;

FIG. 7 a cross-section of an elastomer grommet providing a passage for the manifold holder in FIG. 3;

FIG. 8 a cross-section of a blanking plug for unused manifold ends;

FIG. 9 a plan view for a corner piece, not shown in FIG. 3, for assembling the casing of the solar heat collecting device in FIG. 3;

FIG. 10 a section along X-X in FIG. 9;

FIG. 11 an end-on view of a blanking device, slide-fitting into the manifold profile for a modification of the solar heat collecting device;

FIG. 12 a side elevation of a connector for fitting the elongate heat collector bodies to the manifolds;

FIG. 15 a plan view of the connection of an elongate heat collector body to the manifold using the connector of FIG. 12;

FIG. 18 represents a side elevation of a side wall region of a panel casing from the outside with an outer slider bracket member;

FIG. 19 represents a similar view of the side wall region alone;

DESCRIPTION OF EMBODIMENTS

Figure 13:
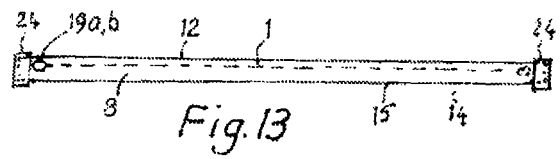
FIG. 13 a side elevation of the complete flat panel solar heat collecting device on a smaller scale.

Referring now to FIG. 1, the most important part of the flat panel solar heat collecting device (see FIGS. 13 and 14) and of the heat collector assembly is the plurality of elongate heat collector bodies 1 of which one is shown as a whole, flanked on either side by adjoining heat collectors 1, shown only in part, in slightly overlapping relationship at the adjoining edges 2. Each elongate heat collector body 1 is formed as an integrally extruded profile comprising a tubular cavity 3 in the form of a tube extending continuously in the extrusion direction coinciding with axis 4 of the tube which tube is preferably of circular cross-section. This circular cross-section offers the advantages of maximum pressure resistance combined with minimum wall thickness and weight. It offers the further advantage of offering minimum obstruction and resistance to the flow of the relatively small volume of heat carrier fluid through the tube, minimum wall surface area on which scaling or other deposits may adhere and minimum risk of blockage, as well as minimum wall area through which heat, once absorbed by the heat carrier fluid, may radiate back into the air space surrounding it or beyond. The tube forming the walls of the cavity 3 is integrally extruded with fin-like formations forming a web 5 flanking the tube 3 on its opposite sides and facing with one side of the web the window aperture area (see FIG. 14) of the panel and the solar radiation entering through such window aperture area.

The webs 5 are shown in FIG. 1 to be integrally connected to diagonally opposite sides of the walls of the cavity and to coincide with and be co-planar with a bisectrical plane of the tube, parallel to the window area. This latter feature of this particular embodiment offers the advantage of minimising the distance by which heat absorbed by the web has to be conducted to the interior of the cavity 3 and also saves on material for the webs. At the same time, the entire half of the tube wall on the side facing the window aperture becomes directly part of the solar heat absorption area and the heat there absorbed need only be conducted through the thin tube wall.

In the embodiment shown, the webs are of uniform thickness throughout and as thin as is compatible with a cost-effective high extrusion rate. This thickness was found to be preferably between 0.6 and 1.5 mm, more preferably from 0.8 to 1.3 mm, most preferably from 1 to 1.2 mm, say 1.2 mm.

It is, however, possible, even though it may become slightly more difficult to extrude at high speed, for the webs to taper from a thicker base towards a thinner edge, once again on average preferably within the thickness limits set out above. This taper may slightly facilitate the flow of heat through the web towards the tube wall.

The webs 5 each extend beyond the external tube cross-section by more than twice the tube cross-sectional diameter, preferably by from 3 to 10 times, more preferably 4 to 8 times, e.g. 4½ to 6 times.

The interior tube cross-section, i.e. the inner diameter in the case of a preferably circular inner tube cross-section is preferably selected with a view to minimising fluid volume without an unduly increased flow resistance, i.e. in the range of 5 to 15 mm, preferably 7 to 12 mm, more preferably 8 to 10 mm, e.g. about 9 mm.

The wall thickness of the tube portion may, for example, be chosen in the same ranges as described above for the webs. Within these limits pressure ratings in excess of 30 bar were determined. With a tube wall thickness of 1.2 mm pressure ratings in excess of 30 bar have been measured.

It is important that the adjoining webs 5 of adjoining elongate collector bodies present to the incoming solar radiation an uninterrupted area for absorption, or substantially so, yet are movable free of mechanical constraint or mutual attachment in relation to one another. They should be freely movable at their edges, in particular transversely to the tube axis and normal to the plane of the webs, to the extent that thermal expansion and contraction causes no significant stresses. This is achieved in accordance with preferred embodiments in that the webs of adjoining collector bodies 1 are disconnected from one another, but overlap preferably at least to the extent necessary, to preserve some overlap even at maximum thermal contraction.

This is in contrast to some prior art recommendations, e.g. in accordance with the aforesaid WO 2006/135942 A3, to provide gaps between and around collector bodies through which solar radiation may reach and heat up the space behind the collector bodies. That prior art teaching has been found to be inferior to the provision of a continuous, uninterrupted area for absorption. The same prior art also taught providing the area for absorption with a plurality of absorption fins normal to the plane of the panel on the fallacious assumption that this would improve absorption of solar radiation entering the window aperture area sideways. In reality, the purported advantage is neutralised by the shadows cast by the fins which add to the weight and cost of the panel. For similar reasons, other prior art proposals to aid adsorption by the webs of adjoining collector bodies lying at an angle to each other are fallacious. These prior art proposals merely increase the weight and cost of material employed and the complexity of the extrusion dies and contribute to re-radiation heat losses from the fins.

It is for those reasons, as well as simplicity and neatness of design as well as for minimising the thickness of the panel casing needed for accommodating the heat collector assembly that the invention teaches that the webs 5 on opposite sides of the tube 3 extend from the tube at an angle to one another of preferably 180° and, if deviating from 180° at all, doing so only minimally by not more than 5° in either direction or at the most by 10°. Indeed, it is preferred for the webs on opposite sides to be coplanar or, if differing from one another in level, to do so by not more than the thickness of the webs where adjoining webs overlap as explained below.

Preferably, the disconnected mutually overlapping edge regions 2 of the webs 5 of adjoining collector bodies lie one on the other in loose sliding contact and preferably overlap by not more than 10 mm, more preferably by not more than 5 mm when cold, e.g. by from 1 to 3.5 mm, say 3 mm. The surfaces of the regions of overlap are preferably flat and smooth, thereby minimising resistance to sliding movement in relation to one another, e.g. resulting from thermal expansion and contraction. In FIG. 1 the overlapping edges of the webs 5 on opposite sides of any of the successive tubular cavity are alternatingly on top of or below the edges of adjoining collector bodies.

Tests have shown that the above feature of slightly overlapping edges of the smoother webs in sliding engagement functions perfectly to avoid prior art thermal expansion stresses manifested audibly and visibly by significant distortion.

An alternative to the embodiment of FIG. 1 is shown in FIG. 2, wherein the same reference numbers are used to denote identical or equivalent integers. In FIG. 2 the webs 5 on opposite sides of the tubular cavity 3 form a continuous sheet extending into, and integral with the top 6 of the tube wall 7. This embodiment offers the visual advantage of a virtually flat top surface with the tube formations hidden from view. In FIG. 2 the webs 5 are shown in the overlap regions 2 to be alternatingly both webs of a collector body on top and those of the adjoining collector body being at the bottom. For minimum friction between the overlapping edges the arrangement of FIG. 1 is preferred, unless the adjoining collector bodies are connected in their tube regions to the manifolds (to be described below) at slightly staggered levels in order to compensate for the thickness of the webs.

Referring now to FIG. 3, the solar heat collecting device, shown here only in part, comprises four side wall members 8 (of which only one is shown, i.e. in section), preferably all having the same extruded profile, preferably of aluminium or aluminium alloy, connected by corner pieces (not shown here, but see FIGS. 9, 10, 13 and 14) to form the four sides of a panel casing 14 and defining at its top side the inner edge 9 of a flange 10 of the window aperture area 11 through which solar radiation is to enter the device. The window aperture area is closed by a highly light-pervious cover panel 12, fitted onto the flange 10 in sealing relationship by virtue of a sealant, not shown. In order to protect the sealant against UV-degradation and at the same time to protect the edge of the cover panel 12 against fracture, this edge region preferably carries a UV-impervious protective layer 13, e.g. of plastics or ceramics.

FIG. 3 shows the protective layer to extend around the edge of the cover panel for mechanical protection. However, with careful handling this is unnecessary. In contrast to the UV-protective layer to be provided on the upper side as shown, an advantageous and preferred alternative is for such layer to be applied to the underside of the cover panel 12 in order to neatly hide the sealant underneath, which is often applied unevenly. A preferred layer is a so-called ceramic band serving as a UV barrier and which can include customised imprints such as logos, trade mark matter and informative matter.

The cover panel 12, preferably of glass, is adapted to reflect back towards the inside of the panel casing radiation of the visible and invisible light spectrum. For that purpose, the bottom surface of the cover panel carries a micro prism finish. A preferred glass is a tempered (toughened) low-iron, "iron-free" plate glass, more particularly soda-lime-silica glass containing from 0-0.2, preferably 0-0.1, e.g. not more than 0.05% Fe, calculated as $Fe_2O_3$, e.g. having the composition according to EN 572: $Na_2O$ 14%, CaO 9%, MgO 4%, $SiO_2$ 73%, $Fe_2O_3$ 0.04%. The micro prism pattern may be that known by the trade name OceanVue or Pacific.

Another preferred type of glass is that available in the trade under the trade mark PROSUN SOLAR of PFG Building Glass which has the chemical composition $SiO_2$ 73%, $Na_2O$ 14%, CaO 8.8%, MgO 4.0% and content $Fe_2O_3$<0.02% and content Ce<5 ppm.

Depending on the degree of impact resistance (hail-resistance) required and the window dimensions (aperture) covered by the cover panel, the glass thickness may e.g. be from 1 to 7, preferably from 3 to 5, e.g. from 3 to 4 mm. An example of a panel of nominally 2 $m^2$ for regions where no hail or only light hail is to be expected has a nominal thickness of 3.2 mm. However, in regions where heavy hail may be expected, a thickness of 4 mm or even 5 mm may be preferred.

The bottom of the panel casing 14 is formed by a backing panel 15 of a suitable sheet material fitted in sealing relationship to the side wall members 8 between a flange 16 and a counter-flange 17 forming part of the side wall member 8. The backing panel may, for example, be made of sheet metal, e.g. aluminium, fibre cement, wood fibre board or preferably a plastics-coated fibre board, e.g. melamine plastics-coated, e.g. the product known in the trade as Formica.

In a preferred embodiment of the side wall member 8, the major portion of its extruded profile comprises a preferably flat side wall portion 18 into which is/are punched or otherwise cut a perforation or perforations 21 where needed, to allow the passage of a manifold connector 19 or other extension of a manifold 20. Such manifolds, connected at opposite ends to a plurality of the elongate heat collector bodies (FIG. 1 or 2) together constitute a heat collector assembly. Above the level of the perforation(s) 21 the side wall portion 18 forms a rebate 22 for accommodating a matching bead 23 of a corner piece 24 to be described further below (FIG. 10), followed in upward direction by a channel-shaped top limb 25, terminating in a downwardly-directed leg 26 parallel to the side wall portion 18 from which projects the flange 10.

Below the level of the perforation(s) 21, the side wall portion 18 forms a T-shaped rebate 125 for accommodating holding formations (not shown) of panel mounting means (not shown). The rebate 125 is, in turn, followed in downward direction by a second rebate 22 which, like the above-described rebate 22 serves to accommodate a second matching bead 23 of the corner piece 24. This is, in turn, followed in downward direction by a bottom limb 27, similar to the above-described top limb 25, except that the leg 26 may optionally be extended by a continuous wall portion 28 which continues upwards to connect up with the T-shaped rebate 125 and become the rear wall thereof. In this manner a closed tubular cavity 29 is formed between the bottom limb 27 and the lower wall of the rebate 125. The tubular cavity 29 improves the torsional rigidity of the profile. The aforesaid flanges 16 and 17 holding the back panel 15 project from the wall portion 28. It will be appreciated that dimensional variations of the side wall profile are within the scope of the invention. For example, the size of the gap between flanges 16 and 17 will depend on the thickness of the backing panel 15 and optional support braces. The height of the cavity 29 can be varied depending on the thickness of the insulation 35.

The important features of the above side wall member 8 as well as those of its combination with the corner piece to be described further below and of the corner piece itself as described with reference to and illustrated in FIGS. 9 and 10 are considered novel and inventive per se and constitute an important aspect of the invention contributing materially to the quality, neat appearance and installation versatility of solar collector panels in general and, in particular, those herein described.

The manifold 20 is machined from an extruded profile having the cross-section illustrated in FIG. 6. The end 30 of the manifold 20 which is connected to the manifold connector 19 is machined to fit the inner diameter of the connector 19, to which it is sealingly connected, e.g. by screwing, but more preferably by bonding, e.g. by soldering, welding or an adhesive. The tubular profile of the manifold is circular except for the front face 49 to which the ends of the heat collector bodies 1 according to FIG. 1 or 2 are to be connected at the localities of circular holes 31, machined, e.g. drilled, for this purpose into the front face 49 of the manifold.

If the overall design and dimensioning of the collector panel and its components is such that a significant gap exists between the manifold 20 and the adjoining end wall 8 parallel to the manifold through which a significant proportion of solar radiation entering through the cover panel 12 could bypass the heat collector assembly, it is possible to wholly or partly close that gap by providing the extruded manifold profile with an integral thermal absorption fin or web (similar to the webs 5 of the heat collector bodies) on the manifold side which is opposite to the flat face 49 and the circular apertures 31 (see FIG. 6). This would increase the thermal efficiency. However, according to the preferred embodiments of the solar panel described herein, the gap referred to is quite insignificant, whereby this option of a fin on the manifold is rendered unnecessary.

By using manifold connectors 19 it becomes possible to introduce or remove the completely assembled heat collector assembly through the window aperture of the fully assembled panel without having to dismantle the panel casing.

However, even once the connectors 19 have been permanently bonded to the manifold, e.g. soldered, and if access to the collector assembly becomes necessary for repair or maintenance, the preferred casing construction using the corner pieces described below with reference to FIGS. 9 and 10 renders such access easy, without damage to the glass cover 12 by simply drilling out four rivets, cutting the seals to the glass cover and backing board and removing the side wall 8. This is an important improvement over many prior art panels.

That end of the manifold connector 19 which projects through the side wall portion 18 is machined to provide coupling formations 32 for connecting the manifold to ducting of the hot water system, such as inlet ducting from the hot water tank and outlet ducting back to the hot water tank of the system. These ductings and control means therefore require no description and can be conventional in principle. The coupling formations 32 may take the form of hose nipples or take the form of internal threads 33 (as shown) or external threads or other configurations, e.g. adapted for articulated connection in manners known per se.

The lower space 34 of the inside of the panel casing between the backing panel 15 and the underside of the heat collector assembly 1, 20 accommodates thermal insulation 35, preferably leaving a gap below the underside of the heat collector assembly and which preferably has a reflective surface, facing the underside of the heat collector assembly, e.g. formed by a reflective coating, e.g. painted on or applied by metal vapour coating, or a layer, e.g. of bright aluminium or tin foil applied thereto, preferably laminated on or bonded on by a heat-resistant bonding agent.

The insulation 35 should be able to withstand the highest temperatures which may occur in practice, preferably (and in accordance with some standards) even those which may occur if the heat collector assembly should accidentally be left exposed to solar radiation in an empty condition for prolonged periods. If expected temperatures are not too extreme, certain heat-resistant expanded plastics, such as some expanded polyurethanes, urea formaldehyde formulations or phenolic resins can be used. For higher temperature resistance inorganic materials such as expanded/foamed glass or ceramic materials, mineral wool, e.g. glass-wool, rock wool, slag wool in loose or compressed form or exfoliated vermiculite (preferably in bonded form) are to be preferred, at least in the upper region of the space 34. Between such very heat-resistant layer and the backing panel 15 a layer of insulating material of lesser heat resistance may be provided, e.g. expanded polystyrene, cellulose fibre and other organic materials or multiple-layer corrugated cardboard composite, preferably resin impregnated. Optionally the insulating material 35 is in the form of a composite panel of two or more materials as set out above. Depending on the nature of the materials used, such composite panel may be bonded to the back panel 15, or the back panel 15 may even be dispensed with.

The side walls of the panel casing are preferably also thermally insulated with heat-resistant insulating material 37, e.g. such as used for the insulation 35 in space 34 and also preferably provided with a reflective surface on the side facing the inside of the panel casing.

Referring now to FIGS. 4 and 5, manifold ends which require no connecting to outside ducting are supported by the side wall members via a manifold slider bracket 38, preferably a moulding, e.g. an injection-moulding of heat-resistant plastics, e.g. fibre-reinforced polypropylene or more preferably a polycarbonate, preferably a UV-stabilised polycarbonate, which can endure high temperatures and has excellent mechanical strength, in particular impact strength. The slider bracket 38, as shown in this example, comprises a square tubular body 39, the inside of which is to accommodate the respective manifold end, in sliding relationship lower and upper shoulders 40 and 41, determining the level of the manifold end by such shoulders being in sliding engagement with the side wall profile of the panel casing, in this example with the outside walls of rebates 22 and 125, respectively. From these shoulders 40 and 41 project downwardly and upwardly-directed flanges 42 and 43 which respectively fit slidingly into a matching groove 44 formed between the T-bar of the rebate 125 and the side wall portion 18 on the one hand, and into the constricted passage 45 formed between the bottom wall of the rebate 22 and the leg 26 on the other hand. This arrangement allows the manifold end, indicated by broken lines 20, to slide axially in the square tubular body 39 and the whole assembly to slide transversely to the manifold axis 46 in order to allow for thermal expansion and contraction of the heat collector assembly.

The above described manifold slider bracket 38 may also be used for mounting a manifold end and manifold connector 19 projecting through the side wall of the panel casing, provided the perforation through the side wall is designed to accommodate sufficient movement to compensate for thermal expansion and contraction and that suitable flexible sealing between the connector and the side wall is provided for weather proofing.

The slider bracket 38 and the manner in which the manifold, and thereby the entire collector assembly is supported freely movably inside the panel casing by the slider bracket 38 is a further important preferred inventive feature of collector panels according to the invention, offering substantial advantages over what is common prior art practice. According to such prior art, the collector assembly rests loosely on the rock wool or other insulation on or forming part of the backing of the panel in frictional engagement with such insulation. The relative movement between the collector assembly and the insulation caused by thermal expansion and contraction causes abrasive wear and tear.

FIG. 6 shows the profile from which the manifolds 20 are machined, comprising a generally tubular body 47 having a generally circular outer periphery and a circular inner periphery 48. The generally circular outer periphery has a flat portion representing the front face 49 on the side through which the circular holes 31 are to be machined, where the elongate heat collector bodies 1 are to be connected. The wall thickness between the inner and outer peripheries 47, 48 must be sufficient to allow for the machining of the manifold end to fit the manifold connector 19 and withstand whatever pressure the solar heat collecting device is designed for and to provide sufficient mechanical rigidity to support the weight of the heat collector assembly and of the heat carrier fluid inside thereof. A small longitudinal ridge 50 serves for axially positioning inside the manifold any blanking device(s) to be described below with reference to FIG. 11.

Referring now to FIG. 7, an injection-moulded heat-resistant elastomer grommet 51 has an inner periphery 52 tightly fitting around the outer periphery of the manifold connector 19, where it passes through the perforation 21 of the side wall portion 18 of the side wall member 8. It also has an outer annular groove 53 for accommodating the edge defining the perforation 21 of the side wall portion 18 with a snap-fit. For weather-proofing a sealant may be applied to the surface of the groove 53, e.g. that formed by the chamfered outer annular flange of grommet 51. The elastomer may e.g. be an isoprene polymer. A suitable elastomer is commercially available under the trade name Forprene.

Referring to FIG. 8, ends of the manifold 20 which are not used for connecting to any ducting are blanked off by any suitable closure means. An example is a manifold blanking plug 54 having a plug member 55 fitting tightly into the inner periphery of the end of the manifold 20 to be blanked off, and an end plate 56 of larger diameter forming a shoulder 57 serving as a marginal stop formation limiting the depth of insertion of the plug into the manifold. The plug 54 can be made of any suitable heat-resistant resilient or rigid material and is to be fitted in sealing relationship to the manifold and e.g. held in place by an adhesive or, alternatively, if made of metal, preferably aluminium or aluminium alloy by soft or hard soldering or welding. Alternatively, the plug may be screw-threaded and be screwed into a correspondingly screw-threaded end of the manifold. Dimensions and details of the plug member 55 depend on the selected manner of fitting it.

If the plug is to be soldered in place, its plug portion can be quite minimal, e.g. just enough for positioning inside the manifold. The manifold end, which is blanked off, may optionally be used for the insertion and accommodation of a sacrificial anode, e.g. of zinc, if it is found necessary to protect the collector assembly against corrosive conditions. For that purpose, the plug should either itself be removable or have a closable aperture through its base through which the sacrificial anode can be inserted and held in place out of conductive contact with the aluminium or aluminium alloy of the collector assembly and by inspected and replaced when needed.

The corner piece 24 for assembling the side walls 8 of the panel casing according to FIG. 3 is shown in FIGS. 9 and 10. It can, e.g., be a metal casting, but is preferably moulded, e.g. injection-moulded from plastics, e.g. fibre-filled polypropylene rendered UV-resistant by suitable additives or fillers such as carbon black. An even more preferred material for the corner pieces is the UV-resistant polycarbonate already referred to in the context of the slider bracket 38 according to FIGS. 4 and 5. The corner piece comprises two wall sections 59 at right angles to one another, each of generally elongate C-shaped profile to match the outer periphery of the side profiles, formed by a straight wall portion 60, matching the side wall portion 18 of the side walls 8, an upper bend 61 fitting around the top limb 25 and a bottom bend 62 fitting around the bottom limb 27. The two inwardly-directed beads 23 match the rebates 22 and the bead 58 matches the stem of the T-shaped rebate 125 in FIG. 3.

Each of the two wall sections 59 carries fastening formations which are brought into alignment with corresponding fastening formations in the side wall profiles. In the present example these are represented by fastening apertures 63 for accommodating any suitable fasteners, e.g. screws, self-tapping or otherwise, or rivets, e.g. blind rivets (not shown). The fastening apertures 63 are preferably surrounded by annular beads 63*a*, shown only in FIG. 10, on the outside, providing a counter-sinking depression for accommodating the head of a screw, blind rivet or other fastener.

The corner piece 24 represents a further important novel and inventive feature not found in other solar thermal collector panels. It greatly facilitates the assembly of the panel as well as opening the panel for maintenance access to the interior.

One important function of the corner pieces is to accurately position the cover panel 12 in the frame formed by the surrounding walls and corner pieces when the cover sheet is put in place and sealingly bonded onto the ledge formed by the flanges 10 of the side wall members 8 after the panel casing has been assembled and all internals have been installed. This positioning leaves a uniform gap around the entire periphery of the cover sheet between its edges and the downwardly directed leg 26 of the side wall profile. This gap is then filled completely and neatly with sealing composition to provide a watertight and neat finish. Preferably, the top of the cover panel 12 is flush with the top of the channel-shaped top limb 25.

The bottom band 62 may be provided with a drainage hole 62*a* to allow drainage of seeped-in rain water or water of condensation.

In FIG. 11 a blanking device 64 is shown, briefly mentioned with reference to FIG. 6. Such a device, by virtue of its circular periphery 65, fits with a tight sliding fit into the interior of a manifold 20, in an orientation dictated by the ridge 50 shown in FIG. 6 which matches the groove 66 in the outer periphery of the blanking device 64. This will assure that a bleeding rebate 67, in this example of arcuate profile, but optionally of a different suitable configuration will always, when installed, be in the top region of the manifold interior. The blanking device 64 serves to be inserted into a position of the manifold where it is desired to block the flow of the heat carrier fluid in order to reverse the flow in one part of the panel in relation to the flow in another part. Such reversal may be brought about once or a plurality of times to produce a meandering flow path, whereby the pathway may be lengthened in order to achieve higher temperatures in the outgoing heat carrier fluid. This may be desirable where the solar heat collecting device is part of an indirect water-heating system, where the efficiency of the transfer of heat from the heat carrier fluid depends on the temperature difference between the heat carrier medium passing through the heat exchanger of the hot water tank and the temperature of the water inside the tank.

The purpose of the bleeding formation 67 is to ensure that any air or gas dissolved in the heat carrier medium and released therefrom can bypass the blanking device in order to avoid air locks. If it is known that the panel is to be used with the collector bodies sideways (horizontally), the bleeding formation should be positioned accordingly. If the panel is to be used in any optional position, the arcuate bleeding formation should preferably be extended somewhat peripherally to ensure that part thereof will always be upwardly orientated.

The blanking device may be fixed in position inside the manifold, e.g. by crimping the manifold with a crimping tool or by drilling a hole through the wall of the manifold and inserting a grub screw.

In order to produce the heat collector assembly, it is necessary to connect the elongate heat collector bodies as shown in FIG. 1 or 2 in mechanically strong and pressure-resistant sealing relationship to the apertures 31 of the manifolds 20 at opposite ends of the tubular formations 3 of the collector bodies 1. In certain prior art proposals, such as WO 2006/135942 or GB 2385910, this has been done by using sealing gaskets and screw, e.g. self-tapping screw connections which is labour-intensive, costly and can give rise to damage to the profiles and faulty connections, the development of leaks while in use, inter alia caused by thermal expansion and contraction which cannot be absorbed by the gasket due to its rigidity necessary for high pressure resistance, and other problems, which are difficult or impossible to repair, once they occur. Formations for screw connection also add to the complexity, weight and cost of the profiles.

For that reason the invention prefers connection by bonding, either by adhesive means or preferably by soldering and/or welding. Welding or brazing is preferred. One method is that of butt welding the ends of the tubular formations to the flat surface 49 of the manifold which for mass production can be automated. Preferably, the webs 5 are not connected to the manifolds.

An alternative connection uses connectors 70 as shown in FIGS. 12 and 15 comprising an annular flange 71 having an annular nipple 72 on one side fitting into the apertures 31 of the manifold and a second nipple 73 on the opposite side fitting either inside or outside the tubular formation 3, preferably inside. The flange 71 will automatically serve as a spacer to form a very small gap 75 between the webs 5 and the manifold so that the webs 5 which are not to be connected to the manifold can contract and expand independently of any thermal expansion or contraction of the manifold. Bonding in sealing relationship the connector to the manifold and by way of the flange 71 and nipple 72 seated respectively on the flat surface 49 and in the aperture 31 of the manifold as well as bonding in sealing relationship the tube 3 snugly fitted onto the nipple 73 and against the flange 71 can be performed by adhesive means or preferably by soldering, preferably hard soldering (brazing), and/or welding. For mass production this can be automated.

In embodiments, wherein the connection between the manifold 20 and the collector body 1, e.g. with the intervention of the connector 70, is brought about by welding or soldering, the gap 75 between the manifold and the webs 5 of the connector 70 is enlarged somewhat in the welding/soldering region by cutaway regions 75' of the webs 5 in order to facilitate heat application and reduce conductive heat loss from the regions of heat application.

These connectors 70 which are considered novel per se in this art can facilitate assembly and contribute to the strength of the connection. It will be understood that the annular flange 71 and the nipples 72 and 73 form an integral unit. The nipple 72 in the example has a length corresponding to the wall thickness of the manifold at the flat surface 49. The nipple 73 may be longer.

Figure 16:
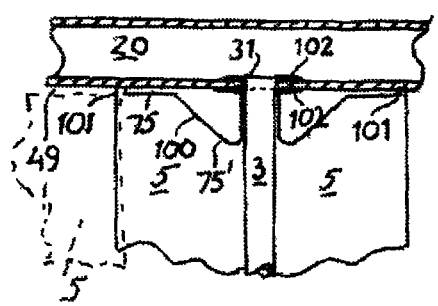
FIG. 16 a partial plan view of the connection of an elongate heat collector body to the manifold by direct bonding without a connector.

In FIG. 16 only one elongate heat collecting body is drawn in solid lines. The adjoining web 5 of one of the adjoining heat collecting bodies is merely indicated diagrammatically in broken lines. FIG. 16 shows an embodiment wherein the bonding of the collector body 1 to the manifold 20 is successfully and even more simply achieved directly, without the intervention of a connector, more particularly by directly welding or soldering, in particular brazing (hard soldering) the protruding end 3' of the tube 3, after its insertion into the aperture 31, in sealing relationship to the manifold 20. For that purpose, the protruding end 3' is stripped clear of any anodising of coating in the welding or soldering region and the webs 5 are cut back along line 100 to form a narrow gap 75 between the webs 5 and the front face 49 of the manifold, the size of the gap 75 being defined by spacer formations 101 projecting from the webs and abutting against the front face 49 and cut-away regions 75' adjoining the tube 3 in the welding, soldering or brazing region in order to facilitate heat application to and reduce heat loss from the regions of heat application. In order to avoid corrosion, it is important to ensure that the brazing or welding material is compatible with the composition of the extruded profiles and forms a complete welding or brazing bead 102 on the outside and on the inside of the manifold and completely penetrates and fills the interface between the walls of the aperture 31 and the outside of the end 31 of the tube 3. Any flux used must be free of corrosion inducing components. Temperature control is necessary in order to avoid damaging the metallurgical micro-structure of the extruded components.

Preferably, the spacer formations 101 are removed after the brazing or other bonding step or may be replaced by temporary spacer means present only during assembly and brazing. This will enhance the freedom of movement between the manifold and the webs 5 to allow for thermal expansion and contraction.

Figure 17:
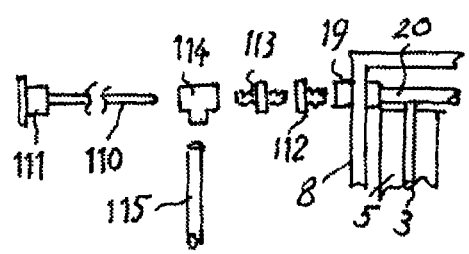
FIG. 17 a diagrammatic exploded view of an inlet/or outlet connection of the solar heat collecting device adapted for accommodating a sacrificial anode for corrosion protection.

For further protection against corrosion, one or more protective sacrificial anodes, e.g. of zinc or magnesium, may be installed, preferably in a manner allowing easy inspection and, if necessary, replacement. FIG. 17 shows an example of this. As shown there, a sacrificial anode is inserted in a removable manner from outside the solar heat collector device into the manifold 20 of the latter, more particularly through the manifold connector 19 passing through the side wall member 8. The sacrificial anode 110 takes the form of a rod made of a metal higher in the electrochemical series than aluminium, e.g. zinc or magnesium, attached, preferably, coaxially to a holder 111, fitted or adapted to be fitted, in sealing relationship, onto or into the far end of the connector 19 or an extension thereof.

In the present example, such an extension is formed by fittings forming part of the fluid inlet or outlet system, by which the solar heat collector device is connected to hot water or other heat storage means. More particularly, an adapter (e.g. reducer) bush 112 fitted to the connector 19, followed by a nipple 113, followed in turn coaxially by the T-bar of a T-piece 114, through the far end of which the anode 110 is inserted and into which far end the holder 111 is fitted, e.g. screwed in sealing relationship. A fluid duct 115 connects the stem of the T-piece to the fluid inlet or outlet of the heat storage means (not shown). The holder 111 isolates the sacrificial anode electrically from the manifold.

It will be understood by those skilled in the art that, in what has been disclosed in the aforegoing, the heat carrier fluid circulating into, through and out of the solar heat collector device, may be water to be heated directly or any fluid medium, e.g. an aqueous glycol solution or other antifreeze solution or any other heat carrier fluid to be used, e.g. for indirect water heating or for transferring heat for any other purpose. The heat carrier may be circulated by thermo-siphoning or pump action.

Figure 14:
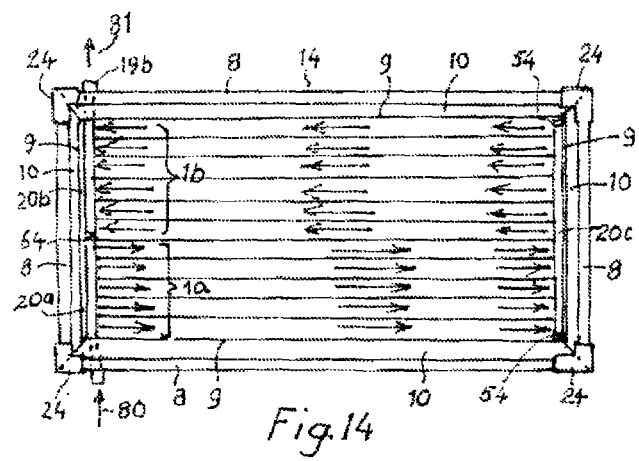
FIG. 14 a plan view of the complete flat panel solar heat collecting device in FIG. 13.

FIGS. 13 and 14 show diagrammatically in plan view and side elevation respectively, a complete embodiment of a panel according to the invention, assembled for use in a closed loop, indirect heating solar hot water installation with pumped circulation. Only the most fundamental integers are shown here, denoted by the same reference numbers as before. The outlines of the panel casing are defined by the side wall members 8, chamfered at their ends and held together by the four corner pieces 24. The backing panel 15 and the cover panel 12 are symbolically indicated in FIG. 13 only, as is the position of the plurality of elongate heat collector bodies 1, the outlines of eleven of which are indicated in FIG. 14, where five thereof are denoted as 1*a* and have arrows indicating a direction of flow of heat carrier fluid to the right, whereas the remaining six are denoted as 1*b* and have arrows indicating a direction of flow in the opposite direction, namely to the left.

The outlines of the window aperture area of the panel are defined in FIG. 14 by the edges 9 of flanges 10 of the side wall members 8.

In this embodiment the left-hand manifold is divided into an inlet section 20*a* and an outlet section 20*b* by the blanking device 64 according to FIG. 11 which diverts the flow of heat carrier medium entering (arrow 80) the manifold inlet section 20*a* through the inlet manifold connector 19*a* to flow through the elongate heat collectors 1*a* towards the manifold 20*c* on the right-hand side. This flow from a heat exchanger (not shown) of a hot water tank (not shown) is propelled by a pump (not shown) driven, controlled by a control system, by a source of electric power, optionally supplied by a small PV panel or by a mains source of power, directly or via a storage battery. From the manifold 20*c* the flow of heat carrier fluid is reversed, as shown by arrows, to the left-hand side through the elongate heat collector bodies 1*b* feeding into the outlet manifold section 20*b* and from there through the outlet manifold connector 19*b*, arrow 81, back to the heat exchanger in the hot water tank.

The manifold connectors 19*a* and 19*b* are installed in the manner described with reference to FIGS. 3 and 7. The manifold 20*c* is blanked off at both ends by means of the blanking plug 54 according to FIG. 8 and is mounted at both ends in manifold slider brackets (not shown here) as described with reference to FIGS. 4 and 5.

The flow pattern just described approximately doubles the length of the flow path and thereby the exposure of a given flow of heat carrier medium to solar radiation and thereby increases the temperature of the heat carrier medium flowing back to the heat exchanger in order to increase the rate of heat transfer from the heat carrier medium to the water being heated in the hot water tank. It will be appreciated that a similar effect may be achieved by connecting in series two panels, each designed for unidirectional flow from one manifold to the other.

The aluminium or aluminium alloy profiles used for assembling the heat collector assembly should be surface-treated for optimising heat absorption on the surfaces exposed to solar radiation, preferably with a jet black or mat black finish, either before or after assembly. A preferred method is by anodising. An alternative method is black chromating. Generally, the surface treatment is selected according to criteria of durability under the conditions of use, in particular those of temperature and of intense solar radiation. Coating methods resulting in an interface between the coating and the aluminium substrate interfering with an effective heat transfer to the heat carrier fluid are not preferred.

Where it is technically feasible to do so, it is preferred to limit the heat absorptive (black) surface finish to surfaces and surface regions where solar radiation is to be absorbed and collected and to leave other surfaces in a reflective condition or, where this is impractical, those other surfaces may be subsequently treated to render them reflective in order to reduce absorbed heat loss by re-radiation.

This applies more particularly to the rear side of the heat collector assembly or parts thereof, such as the rear of the elongate heat collector bodies. This may be achieved by coating with heat-resistant bright coating compositions, electrostatic coating or vapour-coating, e.g. metallizing or electroless coating.

Furthermore, for improved thermal efficiency care should be taken to minimise heat bridges from the interior of the panel casing to the outside by effective insulation.

Also, care must be taken to provide venting apertures which whilst small enough to prevent undue ingress of rain, will nevertheless prevent condensation on the inside of the cover panel 12 from interfering with the function of the collector panel.

It will be understood by the person skilled in the art that numerous modifications are possible within the scope of the invention. For example, instead of passing inlets and outlets for heat carrier medium through the sides of the panel casing, it may be preferred to do so through the back of the panel in order to conceal the inlet and outlet ducting and to reduce the exposure thereof to weather influences.

From the above description of the collector panel and its components the method of assembling the panel is self-evident and may be summarised as follows:

The extruded profile for the surrounding walls is accurately cut to the required lengths for the four sides with a 45° angle chamfer. Holes (not shown in FIG. 3) are drilled or punched to match the positions of fastening apertures 63 of the corner pieces in FIG. 10 as well as (where necessary) to provide for the passage of the manifold connector 19.

As the frame is assembled from the pre-cut profiles and the corner pieces, fixed to the profiles by blind rivets, the backing board is inserted and glued and sealed in place (preferably with the same sealant as used for the cover panel). The sealant may e.g. be of a type curing on exposure to air. Two-component sealants may also be used. For cost and weight-saving reasons, the backing sheet may be quite thin, provided adequate braces e.g. of light metal angle profiles are applied, e.g. adhesively, e.g. using a two-component glue, which cures within minutes, to the inward side of the board.

Panels of compressed rock wool (or other insulation), dimensioned according to the spacing of the braces, are then bonded, e.g. using high temperature-resistant water-based glue, onto the backing board to form a continuous insulating layer 35 in FIG. 3 onto the top of which a shiny aluminium foil or composite is bonded, e.g. using the aforesaid water-based glue.

The complete collector assembly is now inserted through the window aperture and connected up and suspended above the insulation 35 using the manifold connectors 19, slider brackets 38 and grommets 51, as described above, whereafter the cover panel may be applied and sealed as described to close the panel.

For direct water heating the heat carrier fluid is itself the water which is to be heated for use as hot water. Such water should preferably have low hardness in order to avoid scale formation inside the tubular cavities of the heat collector bodies. Such water should also have low corrosivity towards the aluminium or aluminium alloy employed.

Indirect heating is generally employed where in view of the above criteria the available water (tap water) is unsuitable for direct heating and/or where ambient outdoor temperatures may cause freezing of water inside the heat collector assembly. In such cases, conventional aqueous solutions of anti-freeze compositions such as glycols, polyglycols, e.g. polypropylene glycol or glycerol are employed as the heat carrier fluid. So-called "inhibited" anti-freeze compositions, e.g. inhibited glycol, are particularly preferred, because their inhibitors content protects the aluminium or aluminium alloy against corrosion. A suitable commercial product has the following specifications:

Embodiments of the invention having high heat resistance, e.g. where the heat collecting assembly has been assembled by welding, may be employed for heating heat carrier fluids in gaseous or vapour form to high temperatures or for heating to high temperatures heat carrier fluids consisting of high boiling liquids, such as anthracene oil or other liquids used in the art for various purposes where temperatures well above the boiling point of water are required or desired.

The high heat resistance, combined with high pressure resistance, opens up new applications, such as refrigeration and air-conditioning, low to medium pressure steam raising, conversion of the collected heat into mechanical and electrical power via engines using steam or other vapours or Stirling engines.

Referring to FIGS. 18-24 of the drawings, there is shown an extruded aluminium alloy profile forming a side wall 201 of the casing of a solar heat flat panel collector of the type described with reference to the preceding FIGS. 1 to 17 of the drawings. The flat wall region 202 of the side wall 201 has an aperture 203, as shown in FIG. 2, which is elongate and dimensioned for the passage there through and through the wall region 202 of a tubular end member 204, fitted to the end of a manifold 205 of a heat collector assembly. The shape and dimensions of the elongate aperture 203 are designed to allow linear displacement as shown by the arrows 206 of the end member 204 transversely to the wall region 202 in a sliding direction, normal to the axis 207 of the end member and parallel to the extrusion direction of the profile forming the side wall 201, which side wall 201 has an outside 208 and an inside 209.

On the outside 208 the side wall 201 has guide profilings 210 and 211, parallel to the sliding direction 206. On the inside 209 the side wall 201 has guide profilings 212 and 213, parallel to the sliding direction 206. It should be understood that the guide profilings 210-213 may have additional functions in the overall context of the panel, e.g. as described in the aforesaid earlier PCT application.

For supporting the solar heat collector assembly by way of the tubular end member 204, the suspension mechanism uses a slider bracket composed of an outer slider bracket member 214, performing the function of an external closing plate and an inner slider bracket member 217. The outer slider bracket member 214 is in sliding engagement with the outside 208 of wall region 202 and has guide formations 215, 216, matching and in sliding engagement with the guide profilings 210, 211. The inner slider bracket member 217 has guide formations 218, 219, matching and in sliding engagement with the guide profilings 212, 213.

The outer and inner slider bracket members 214, 217 on opposite sides of the wall region 202 are rigidly interconnected by fasteners 220, e.g. screws passing through the elongate aperture 203 on opposite sides of the tubular end member 204. For accommodating the fasteners and at the same time limiting the extent of the sliding movement of the slider bracket 214, 217, the elongation of the aperture 203 is extended by tapering extensions 221.

The distance between the slider bracket members 114, 117 matches the thickness of the wall region 202 with just sufficient tolerance to provide for easy sliding. This distance (see the gap 262 in FIG. 24) is determined by hollow cylindrical spacer studs 260, through each of which one of the fasteners 220 passes. The spacer studs 260 may preferably be integral with either of the slider bracket members, in this example with the outer slider bracket member 214 and preferably each fit into a matching socket 263 of the other slider bracket member, in this case the inner slider bracket member 217.

The slider bracket members 214, 217 are preferably made, e.g. by injection moulding, of a plastics having a low coefficient of friction when sliding on the smooth surface of the side wall region, e.g. made of aluminium, and being able to withstand high temperatures, preferably a thermoplastic resin composition, UV-stabilised polycarbonate being particularly preferred.

The aforesaid tapering extensions 221 of the aperture 203 terminate in a curvature 270, matching the exterior curvature of the hollow cylindrical spacer studs 260 and serve as stop formations which, by engagement with the respective spacer stud 260, limit the extent of sliding movement 206 of the slider bracket, the other slider bracket member 214, as shown in FIG. 18, stopping just short of the edge 271 of a corner piece 272 of the frame of the flat panel solar heat collector panel.

Figure 20:
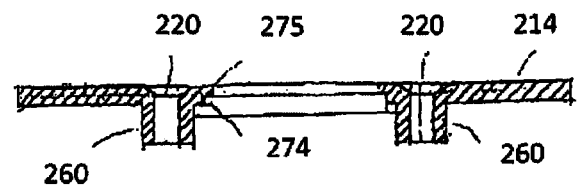
FIG. 20 represents a longitudinal section along line XX-XX in FIG. 18 of the outer slider bracket member above.
Figure 22:
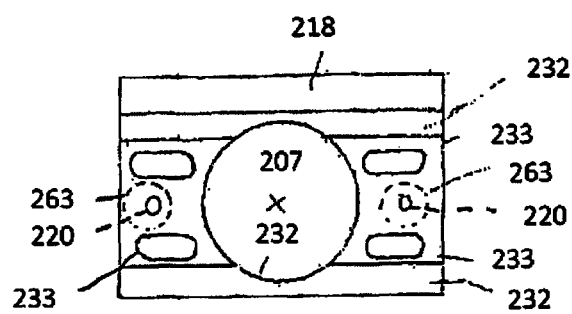
FIG. 22 represents a side elevation of the inner slider bracket member.
Figure 21:
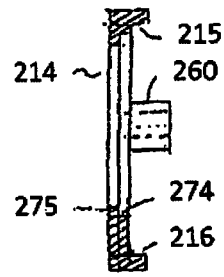
FIG. 21 represents a cross section of the outer slider bracket member along line XXI-XXI in FIG. 18.
Figure 24:
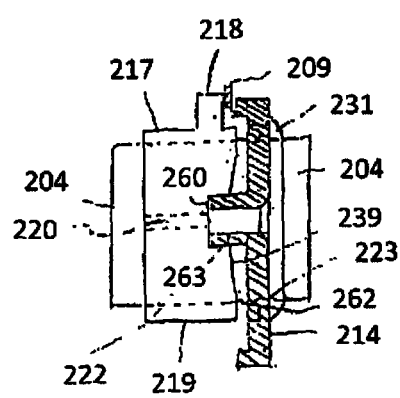
FIG. 24 represents a sectional view taken along line XXIV-XXIV in FIG. 18 of the slider bracket assembly.
Figure 23:
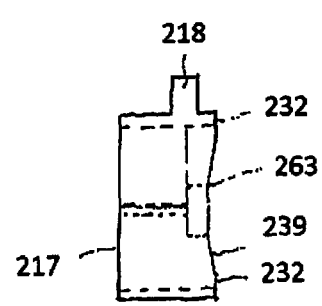
FIG. 23 represents an end on view of the inner slider bracket member.

Because the axis 207 of the end member 204 coincides with the axis of the manifold 205 (shown fully only in FIG. 25), the solar absorption area of the solar heat collector assembly is preferably extended by a web or fin 273, shown in broken lines in FIG. 19, connected to and preferably integral with the manifold 205, of which a portion is diagrammatically indicated by a broken line 205 as shown in FIGS. 20 and 21.

The preferably internally screw-threaded end member 204 which is either integral with the manifold 205 or is fitted thereto as a coaxial linear extension of the manifold 205, is accommodated with a tight fit in a matching aperture 222 of the inner slider bracket member 217 and from there passes first through the elongate aperture 203 of the wall region and then passes in sealing relationship through a further aperture 223 of the outer slider bracket member 214. The sealing relationship may be provided by a sealing substance, but is preferably provided by an elastomeric grommet 231. For fitting the grommet 231 to the outer slider bracket 214, the latter is recessed at 274 to form an inwardly directed annular flange 275 matching an external annular groove of the grommet surrounding the outer periphery of the end member 204.

The end member 204 is preferably threaded, preferably by an internal thread 225 for connecting whatever fittings are needed, e.g. inlet or outlet ducting, optionally fittings for holding a sacrificial anode for corrosion protection (as more fully described with reference to FIG. 17) or alternatively for blocking off that manifold end with a threaded plug.

In order to cover or partly cover any gap between the manifold 205 and the adjoining parallel panel end wall 226, fitted to the side wall 201 by a corner member 227, the manifold 205 may carry an absorption web or fin 228 forming an integrally extruded part of the extruded manifold profile.

As in the case of the embodiments of FIGS. 1 to 17, the solar heat collector assembly is preferably formed by two aluminium alloy manifolds at opposite ends between which a plurality of extruded aluminium alloy collector bodies are fitted, the collector bodies each consisting of a tubular passage connected to the manifolds and flanked on opposite sides by absorption webs or fins slightly overlapping with the webs or fins of the adjoining collector body, to form a continuous absorption surface. The overlapping fins are not interconnected.

The above described slider bracket arrangement supporting an end member 204 at one end of one of the manifolds 205 is preferably repeated at the opposite end of the manifold 205 in relation to the side wall on the opposite side of the panel.

Normally, only one of the manifolds is thus movably suspended. The second manifold at the opposite end of the solar heat collector assembly will usually be suspended from the side walls in substantially fixed interrelationship by means of end members 229, e.g. identical to the end members 204, passing through matching apertures 230 through the side wall 201 in sealing relationship provided by elastomeric grommets 231. Such an arrangement provides limited flexibility due to the elasticity of the grommets and also a degree of slidability in the axial directions, but no slidability transversely to the plane of the side wall.

In a preferred embodiment of the invention, the side 236 of the inner slider bracket member 217 facing the elongate aperture 203 is slightly concave at 239 between two narrow flat surface strips 232 in sliding contact with flat areas of the side wall 201, parallel to the sliding direction 206 adjoining the elongate aperture 203.

Also, deep depressions 233 are provided near each of the four corner regions of the inner slider bracket member 217. These depressions not only save material, but also facilitate rapid and uniform solidification of the moulding during manufacture by injection moulding.

Figure 25:
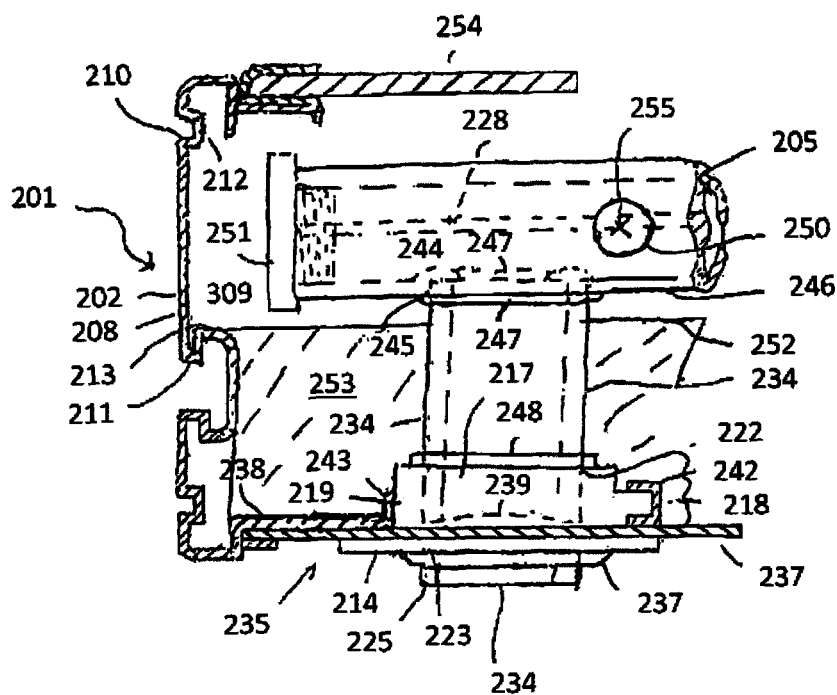
FIG. 25 represents a diagrammatic sectional view of a different embodiment of a suspension of a solar heat collector assembly, wherein the manifold end member passes through the backing wall of a panel casing.

The features described with reference to FIGS. 18 to 24, when combined with features of FIGS. 1 to 17, serve to minimise thermal stresses in solar heat collecting flat panels. Referring now to FIG. 25, parts which are the same or functionally the same as in FIGS. 18 to 24 are indicated by the same reference numbers as before.

In the aforegoing description, with reference to FIGS. 18 to 24, it was assumed that the solar heat collector assembly would be suspended in the panel casing from the side walls fitted with slider brackets, more particularly where the inlets and outlets for heat carrier medium would pass coaxially with their manifolds 205 through the side walls 201. However, if, in the alternative, the inlets and/or outlets are intended to pass through the back wall, i.e. the underside of the panel, it is also possible to provide the slidable suspension mechanism as part of the back wall, i.e. in a plane normal to the plane of the side wall and using tubular end members 234 of the respective manifold 205 orientated at right angles to the manifold axis and passing through the back wall 237, i.e. the underside 235. In order to achieve this, a piece of profiled section (not shown) incorporating the relevant features of the flat wall region 202 and adjoining relevant features may be fitted to the backing wall 237 itself at right angles to the side wall, or as only diagrammatically indicated in FIG. 25, may be otherwise fitted to the backing wall 237 or may be partly or wholly integrated as a flange extension 238 at right angles to the side wall 201, in order to provide guide profilings 242 and 243 fitting and matching the guide formations 218, 219 of the inner slider bracket member 217.

The end member 234 is in the example of FIG. 25, welded or hard soldered (brazed) to the manifold 205 by having its end 244 inserted into a matching hole 245 through a plane wall region 246. The welding or hard soldering is performed with automatic temperature control to produce the desired flow of a welding or soldering substance compatible with the aluminium alloy of the extruded manifold 205 and the end member 217, so as to completely fill the interface between the hole 245 and the end 244 and form a perfect inner bead 247 and outer bead 247' free of hair cracks.

In order to prevent downward slipping of the end member 234 through the aperture 222 of the inner slider bracket member 217, the latter may have an external shoulder or flange 248 or other arresting means.

Also in FIG. 25 there is shown a hole 250 where an end of the riser tube portion of one of a plurality of absorber bodies is to be fitted to the manifold, essentially in a manner analogous to the fitting by welding or brazing described above with reference to FIG. 10 for the tubular end member, in order to complete the solar heat collector assembly.

In this example, the end of the manifold is closed by a screwed-in plug 251. It will be understood that this plug could also be used as a holder for a sacrificial anode projecting into the manifold.

The manifold 205, together with the remainder of the entire solar heat collector assembly is supported on the tubular end member 234 freely and movably suspended above and clear of the upper surface 252 of a heat resistant layer of insulation 253, and underneath the solar radiation admitting cover panel 254, e.g. having the characteristics set out with reference to FIGS. 1 to 17.

The linear sliding direction dictated by the mounting of the slider bracket 214, 217 and its guiding formations may be at an angle to the projection of the longitudinal axis 255 of the riser tubes, such angle being calculated in accordance with the longitudinal and lateral dimensions of the solar heat collecting assembly in order to compensate for thermal expansion and contraction in both dimensions.

What is described with reference to FIG. 25, in combination with the features of FIGS. 1 to 17, can likewise minimise thermal stresses.

To the extent that this may be relevant in the context of thermal expansion and contractions, e.g. the overlap between the webs (fins) of adjoining heat collector bodies of the heat collector assemblies, measurements given are generally measured in the cold condition, i.e. at ambient room temperature of 20° C.

The intended scope of protection for the present invention extends to all novel and inventive features disclosed above and their uses in various combinations, all of which in their own right, even where such importance has not been expressly emphasised.

The invention claimed is:
1. A solar heat flat panel collector device which includes the following features:
   a wall region having an aperture dimensioned for the passage there through and through the wall region of an end member of a manifold of the solar heat collector assembly and for allowing linear displacement of the end member transversely to the wall region in a sliding direction, normal to the axis of the end member;
   an outer slider bracket member in sliding relationship to the outside of the wall region and covering the outside of the aperture through the wall region within the limits of joint linear displacement of the outer slider bracket member and the end member of the manifold, said end member being held in the outer slider bracket member;
   an inner slider bracket member in sliding relationship to the inside of the wall region and in fixed relationship to the outer slider bracket member, the end member of the manifold passing through and being supported in an aperture of the inner slider bracket member; guide profilings on the wall region parallel to the sliding direction; and guide formations on either or both of the outer slider bracket member and the inner slider bracket member, said guide formations matching and being in sliding engagement with guide profilings as aforesaid on the outside of the wall region.

2. A solar heat flat panel collector device as claimed in claim 1, wherein the wall region is a region of a side wall of a panel casing for containing the solar heat collector assembly and the axis of the end member is coaxial with or parallel to a longitudinal axis of the manifold.

3. A solar heat flat panel collector device as claimed in claim 1, wherein the wall region is a region of a bottom wall of a panel casing for containing the solar heat collector assembly and the axis of the end member is normal to a longitudinal axis of the manifold, and wherein the sliding direction is designed to compensate for thermal expansion and contraction parallel to the plane of the bottom wall.

4. A solar heat flat panel collector device as claimed in claim 1, wherein the outer slider bracket member, through which passes in sealing relationship the end member for the manifold, in all its sliding positions, performs the function of an external closing plate covering the aperture for the passage therethrough of the end member of the manifold, and has guide profilings matching and in sliding engagement with guide profilings on the outside of the wall region the inner slider bracket member has guide formations matching and in sliding engagement with guide profilings on the inside of the wall region; the outer and inner slider bracket members on opposite sides of the wall region are rigidly interconnected by fasteners passing through the aperture on opposite sides, in the sliding direction of the tubular end member and for accommodating the fasteners and, at the same time, limiting the extent of the sliding movement of the slider bracket, the aperture through the wall region is extended by sliding limiting extensions.

5. A solar heat collecting device of the flat panel type, including a panel casing defined by an upper side which provides a window area for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, and wherein the elongate collector bodies, the tubular cavities of which have their aluminum inner peripheries exposed to the interior cavity, have an end immovably affixed in sealing relationship to a wall of a respective manifold made of material galvanically compatible with aluminum and through an aperture in the wall communicating with the manifold.

6. The device as claimed in claim 5, wherein in order for the webs of adjoining heat collector bodies to be movable in relation to one another, these webs of adjoining collector bodies are disconnected from one another but overlap.

7. The device as claimed in claim 6, wherein the webs of adjoining heat collector bodies overlap by not more than 5 mm.

8. The device according to claim 5, wherein the webs are disconnected in relation to the manifold and can contract and expand independently of any thermal expansion or contraction of the manifold.

9. The device according to claim 5, wherein the ends of the tubes are sealingly connected by welding, soldering or brazing to the holes of the manifolds through which holes the tubes communicate with the manifold interior, and wherein the webs remain moveable in relation to one another through expansion and contraction and/or through elastic flexing of the elongate heat collector bodies.

10. The device according to claim 9, wherein such tube is so connected by directly welding or soldering or brazing (hard-soldering) the protruding end of the tube after its insertion into the aperture in sealing relationship to the manifold, the webs forming a narrow gap between the webs and the front face of the manifold.

11. The device as claimed in claim 10, wherein bonding has been performed, using a brazing or welding material compatible with the composition of the extruded profiles and which forms a complete welding or brazing bead on the outside and on the inside of the manifold and completely penetrates and fills the interface between the walls of the aperture and the outside of the end of the tube.

12. The device as claimed in claim 5, wherein the webs each extend beyond the external tube cross-section by more than twice the tube cross-sectional diameter, the tube inner diameter is in the range of 5 to 15 mm, the wall thickness of the tube portion and the thickness of the webs are from 0.6 to 1.5 mm, and the side of the heat collector bodies which is to face solar radiation in the collector panel is treated for improved absorption of the solar spectrum, the other surfaces being left in a reflective condition or treated to render them reflective.

13. The device as claimed in claim 5, wherein the manifolds of the heat collector assembly are made of tubular extruded aluminum or aluminum alloy bodies having a wall face with holes to each of which an end of a tube of a heat collector body is sealingly connected and through which hole the tube communicates with the manifold interior and wherein a manifold carries an integrally extruded heat absorber web on its side opposite to the heat collector bodies.

14. The device as claimed in claim 5, wherein a sacrificial anode is inserted in a removable manner from outside the solar heat collector device into a manifold.

15. The device as claimed in claim 5, wherein the surrounding walls of the panel casing are composed of side wall members which are extruded profiles, each such profile, when viewed in cross-section, taken normal to the extrusion axis, being generally C-shaped, formed by top and bottom limbs connected integrally by the upright side wall portion of the profile, wherein the upper limb forms a rebated flange for supporting a solar radiation transmitting and heat trapping cover sheet (normally of "iron-free glass"), the outer boundary of the flange is formed by an upwardly directed limb of a generally channel shaped portion, the arcuate return limb of which links up with and becomes the top of the side wall portion of the profile, the bottom limb of the C-shaped profile approximates a mirror image of the upper limb forming a reversed flange, against which a backing panel is to be fitted and held in place, parallel to the flange, the side wall portion of the profile is generally straight except for a small rebate near the top and a similar rebate near the bottom accommodating matching bead formations of corner pieces holding the four sides of the casing frame together, the ends of the profiles being chamfered at 45°, fitted together to form the sides of the panel casing and so held together by the aforesaid corner pieces having the said beads matching and accommodated in the aforesaid rebates of the profiles, the corner pieces being fitted to the outside of each corner.

16. The device as claimed in claim 5, wherein the entire collector assembly is supported freely movably inside the panel casing to accommodate sufficient movement to compensate for thermal expansion and contraction.

17. The device as claimed in claim 16, wherein manifold ends of the heat collector assembly are supported by panel casing in slider brackets which allow for thermal expansion and contraction of the heat collector assembly.

18. The device as claimed in claim 5, wherein a manifold includes a blanking device blocking the flow of the heat carrier fluid in order to reverse the flow in one part of the panel in relation to the flow in an adjoining part of the panel, the blanking device including a bleeding formation ensuring that air or gas released from the heat carrier medium can by-pass the heat carrier medium to avoid gas/air locks.

19. The device as claimed in claim 5, wherein edge regions of the light pervious cover panel carry a UV-impervious protective layer for protecting a sealant against UV degradation.

20. The device as claimed in claim 5, which includes a suspension of its solar heat collector assembly supported by walls of the solar heat flat panel collector which includes the following features:
  a wall region of the casing having an aperture dimensioned for the passage there through and through the wall region of an end member of a manifold of the solar heat collector assembly and for allowing linear displacement of the end member transversely to the wall region in a sliding direction, normal to the axis of the end member;
  an outer slider bracket member in sliding relationship to the outside of the wall region and covering the outside of the aperture through the wall region within the limits of joint linear displacement of the outer slider bracket member and the end member of the manifold, said end member being held in the outer slider bracket member;
  an inner slider bracket member in sliding relationship to the inside of the wall region and in fixed relationship to the outer slider bracket member, the end member of the manifold passing through and being supported in an aperture of the inner slider bracket member; guide profilings on the wall region parallel to the sliding direction; and
  guide formations on either or both of the outer slider bracket member and the inner slider bracket member, said guide formations matching and being in sliding engagement with guide profilings as aforesaid on the outside of the wall region.

21. A solar heat collecting device of the flat panel type, including a panel casing defined by an upper side which provides a window area for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, wherein the ends of the tubes are sealingly connected by welding, soldering or brazing to the holes of the manifolds through which holes the tubes communicate with the manifold interior, and wherein such tube is so connected by directly welding or soldering or brazing (hard-soldering) the protruding end of the tube after its insertion into the aperture in sealing relationship to the manifold, the webs forming a narrow gap between the webs and the front face of the manifold.

22. The device as claimed in claim 21, wherein bonding has been performed, using a brazing or welding material compatible with the composition of the extruded profiles and which forms a complete welding or brazing bead on the outside and on the inside of the manifold and completely penetrates and fills the interface between the walls of the aperture and the outside of the end of the tube.

23. A solar heat collecting device of the flat panel type, including a panel casing defined by an upper side which provides a window area for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, wherein the manifolds of the heat collector assembly are made of tubular extruded aluminum or aluminum alloy bodies having a wall face with holes to each of which an end of a tube of a heat collector body is sealingly connected and through which hole the tube communicates with the manifold interior and wherein a manifold carries an integrally extruded heat absorber web on its side opposite to the heat collector bodies.

24. A solar heat collecting device of the flat panel type, including a panel casing defined by an upper side which provides a window area for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, wherein a sacrificial anode is inserted in a removable manner from outside the solar heat collector device into a manifold.

25. A solar heat collecting device of the flat panel type, including a panel casing defined by an upper side which provides a window area, for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, wherein the surrounding walls of the panel casing are composed of side wall members which are extruded profiles, each such profile, when viewed in cross-section, taken normal to the extrusion axis, being generally C-shaped, formed by top and bottom limbs connected integrally by the upright side wall portion of the profile, wherein the upper limb forms a rebated flange for supporting a solar radiation transmitting and heat trapping cover sheet (normally of "iron-free glass"), the outer boundary of the flange is formed by an upwardly directed limb of a generally channel shaped portion, the arcuate return limb of which links up with and becomes the top of the side wall portion of the profile, the bottom limb of the C-shaped profile approximates a mirror image of the upper limb forming a reversed flange, against which a backing panel is to be fitted and held in place, parallel to the flange, the side wall portion of the profile is generally straight except for a small rebate near the top and a similar rebate near the bottom accommodating matching bead formations of corner pieces holding the four sides of the casing frame together, the ends of the profiles being chamfered at 45°, fitted together to form the sides of the panel casing and so held together by the aforesaid corner pieces having the said beads matching and accommodated in the aforesaid rebates of the profiles, the corner pieces being fitted to the outside of each corner.

26. A solar heat collecting device of the flat panel type, including a panel casing defined by an upper side which provides a window area for facing and admitting incoming solar radiation; surrounding walls forming a frame between the upper side and a closed underside opposite to the upper side; a heat collector assembly accommodated inside the panel casing, including a plurality of elongate heat collector bodies extending side-by-side, each providing a heat absorption area facing the window aperture area and a tubular cavity for accommodating a flow of heat carrier fluid between manifolds at opposite ends of the elongate collector bodies; an inlet for admitting, in order to be heated, a heat carrier fluid to the heat collector assembly; and an outlet for withdrawing heated heat carrier fluid from the heat collector assembly, wherein the elongate heat collector bodies are each formed as an integrally extruded aluminum or aluminum alloy profile, comprising said tubular cavity in the form of a tube extending continuously in the extrusion direction of the profile and, integrally extruded with the tube on each of the opposite sides of the tube, a web having a side facing the window aperture area, the webs on opposite sides extending from the tube at an angle to one another of between 170° and 190°, the side of the tube facing the window aperture area, together with web areas having a side facing the window aperture area on either side of the tube providing the heat absorption area; the adjoining webs of adjoining elongate collector bodies being movable, free of mechanical constraint or mutual attachment in relation to one another, but together presenting to the incoming solar radiation an uninterrupted area for absorption, viewed in a direction normal to the heat collector assembly, wherein a manifold includes a blanking device blocking the flow of the heat carrier fluid in order to reverse the flow in one part of the panel in relation to the flow in an adjoining part of the panel, the blanking device including a bleeding formation ensuring that air or gas released from the heat carrier medium can by-pass the heat carrier medium to avoid gas/air locks.

27. A solar heat flat panel collector device which includes the following features:
- a wall region having an aperture dimensioned for the passage there through and through the wall region of an end member of a manifold of the solar heat collector assembly and for allowing linear displacement of the end member transversely to the wall region in a sliding direction, normal to the axis of the end member;
- an outer slider bracket member in sliding relationship to the outside of the wall region and covering the outside of the aperture through the wall region within the limits of joint linear displacement of the outer slider bracket member and the end member of the manifold, said end member being held in the outer slider bracket member;
- an inner slider bracket member in sliding relationship to the inside of the wall region and in fixed relationship to the outer slider bracket member, the end member of the manifold passing through and being supported in an aperture of the inner slider bracket member; guide profilings on the wall region parallel to the sliding direction; and
- guide formations on either or both of the outer slider bracket member and the inner slider bracket member, said guide formations matching and being in sliding engagement with guide profilings as aforesaid on the outside of the wall region,
- wherein the outer slider bracket member, through which passes in sealing relationship the end member for the manifold, in all its sliding positions, performs the function of an external closing plate covering the aperture for the passage therethrough of the end member of the manifold, and has guide profilings matching and in sliding engagement with guide profilings on the outside of the wall region the inner slider bracket member has guide formations matching and in sliding engagement with guide profilings on the inside of the wall region; the outer and inner slider bracket members on opposite sides of the wall region are rigidly interconnected by fasteners passing through the aperture on opposite sides, in the sliding direction of the tubular end member and for accommodating the fasteners and, at the same time, limiting the extent of the sliding movement of the slider bracket, the aperture through the wall region is extended by sliding limiting extensions.

* * * * *